US012771787B1

(12) United States Patent
Wiggs

(10) Patent No.: US 12,771,787 B1
(45) Date of Patent: Oct. 20, 2026

(54) SYSTEMS AND METHODS FOR AUTOMATED NAVIGATION OF INTERACTIVE VOICE RESPONSE MENU

(71) Applicant: Outbound AI Inc., Seattle, WA (US)

(72) Inventor: Jonathan Wiggs, Seattle, WA (US)

(73) Assignee: Outbound AI Inc., Seattle, WA (US)

( * ) Notice: Subject to any disclaimer, the term of this patent is extended or adjusted under 35 U.S.C. 154(b) by 546 days.

(21) Appl. No.: 18/079,527

(22) Filed: Dec. 12, 2022

Related U.S. Application Data

(60) Provisional application No. 63/288,863, filed on Dec. 13, 2021.

(51) Int. Cl.

| | |
|---|---|
| ***H04M 3/493*** | (2006.01) |
| ***G06F 3/16*** | (2006.01) |
| ***G10L 15/22*** | (2006.01) |
| ***G10L 15/26*** | (2006.01) |

(52) U.S. Cl.
CPC .......... *H04M 3/4936* (2013.01); *G06F 3/167* (2013.01); *G10L 15/22* (2013.01); *G10L 15/26* (2013.01); *G10L 2015/223* (2013.01)

(58) Field of Classification Search
CPC ...... H04M 3/4936; G06F 3/167; G10L 15/22; G10L 15/26; G10L 2015/223
See application file for complete search history.

(56) References Cited

U.S. PATENT DOCUMENTS

| | | | | |
|---|---|---|---|---|
| 7,317,789 | B2 * | 1/2008 | Comerford | H04M 3/493 704/270.1 |
| 8,155,276 | B2 * | 4/2012 | Beauregard | H04M 3/493 379/74 |
| 9,245,525 | B2 * | 1/2016 | Yeracaris | G10L 15/30 |
| 9,741,347 | B2 * | 8/2017 | Yeracaris | G10L 15/22 |
| 10,049,676 | B2 * | 8/2018 | Yeracaris | G10L 25/39 |
| 11,303,749 | B1 * | 4/2022 | Baror | H04M 3/42068 |
| 12,106,760 | B2 * | 10/2024 | Coman | G10L 15/1822 |
| 12,126,769 | B1 * | 10/2024 | Koul | H04M 3/5175 |
| 12,223,946 | B2 * | 2/2025 | Kwatra | G06F 3/167 |
| 12,613,948 | B1 * | 4/2026 | Bethancourt | G06F 21/32 |
| 2009/0154666 | A1 * | 6/2009 | Rios | G10L 15/26 345/168 |
| 2010/0100377 | A1 * | 4/2010 | Madhavapeddi | G10L 15/22 704/235 |
| 2013/0266127 | A1 * | 10/2013 | Schachter | G10L 25/48 379/88.01 |
| 2014/0040758 | A1 * | 2/2014 | Wohlert | G06Q 10/10 715/744 |

(Continued)

*Primary Examiner* — Lisa Hashem
(74) *Attorney, Agent, or Firm* — Alan D. Minsk; FisherBroyles, LLP

(57) ABSTRACT

Systems and methods for automatically navigating through an IVR system's menu to enable a caller to efficiently accomplish the goal of their call. A model of the menu structure is developed and includes an identification of one or more parts of speech contained in a menu item, and identification of an entity or entities that are part of the menu item, where such an entity may be a noun, a name, a specific object, or the subject of a sentence or phrase. After identifying the parts of speech and the entities involved in the menu item, a "pattern" or contents of each unique path through the IVR system is constructed and associated with a desired response or action.

15 Claims, 8 Drawing Sheets

(56) References Cited

U.S. PATENT DOCUMENTS

| | | | | |
|---|---|---|---|---|
| 2016/0117593 | A1* | 4/2016 | London | G06N 5/04 706/11 |
| 2021/0136213 | A1* | 5/2021 | Paiva | G06F 3/0482 |
| 2023/0412731 | A1* | 12/2023 | Mundie | H04M 3/493 |

* cited by examiner

SYSTEMS AND METHODS FOR AUTOMATED NAVIGATION OF INTERACTIVE VOICE RESPONSE MENU

CROSS REFERENCE TO RELATED APPLICATION

This application claims the benefit of U.S. Provisional Application No. 63/288,863, filed Dec. 13, 2021, and titled "Systems and Methods for Automated Navigation of Interactive Voice Response Menu", the contents of which is incorporated in its entirety (including the Appendix) by this reference.

BACKGROUND

Interactive Voice response (IVR) systems are an automated part of a phone system that interacts with callers and gathers information by providing a caller with choices for a response via a menu structure. The IVR system receives the caller's responses via voice and/or DTMF tones (keypad presses) and performs an action based on the responses. The IVR system enables a caller to interact with a computer-operated phone system to provide information and in some cases the system may execute an action based on the caller's responses, such as forwarding a call to an agent or advising a caller on how to obtain the information they desire.

An IVR system can be deployed in a network and scaled to serve as an initial contact point for a call center, as well as being used for outbound calling. IVR systems can be used to assist a caller with mobile purchases, banking payments, retail orders, acquiring services, travel information, and weather conditions, among other purposes.

Although IVR systems provide many benefits to both callers and businesses that use them, they do have some disadvantages. One disadvantage is that a caller must "navigate" or transition between the various menus and sub-menus of the IVR system to arrive at the choice that will enable them to speak with a human agent or accomplish the goal or purpose of their call. Another disadvantage is that many IVR systems may place a call on hold or require a caller to experience multiple delays or waiting periods before arriving at a meu or sub-menu item that allow them to accomplish the goal of their call. While these problems with navigating through the IVR menu and possible delays are frustrating for an individual caller, they can be a source of inefficiency and reduced effectiveness for a business that interacts with IVR systems as part of operating the business and delivering services to their customers.

Embodiments of the disclosure overcome these and other disadvantages of conventional approaches to interacting with IVR systems, both collectively and individually.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

This disclosure is directed to systems, devices, and methods for automatically navigating through an IVR menu to enable a caller to efficiently accomplish the goal of their call. In one embodiment, this is achieved by using techniques developed in Natural Language Understanding (NLU) to develop a model for the menu structure of an IVR system. In some embodiments, the menu structure may be viewed as a set of unique paths through the IVR system, with each path representing a set of caller responses to each menu or sub-menu item. In one sense, this approach considers the entire IVR menu structure to be a form of state machine in which a caller navigates between states along one of multiple possible paths to reach their desired goal.

In some embodiments, the model of the menu structure comprises an identification of one or more parts of speech contained in a menu or sub-menu item, where the item may take the form of a question, instruction, or statement. In some embodiments, a speech-to-text conversion process may be used as part of this identification. The model may also include the identification of an entity or entities that is part of the menu or sub-menu item, where such an entity may be a noun, a name, a specific object, or the subject of a sentence or phrase, as examples. After identifying the parts of speech and the entities involved in the menu or sub-menu items, a "pattern" or contents of each unique path through the IVR system is constructed and associated with a desired response or action. The response or action may comprise generation of one or more DTMF tones, generation of a spoken term or phrase, or other relevant action.

In an example use case, an embodiment enables a caller to accomplish the purpose of their call more efficiently. The caller may be an agent for a business that is providing information to (or needs information from) a company that utilizes an IVR system as part of its customer service, call center, or general contact telephone system. Instead of the agent having to listen to each prompt in a menu or sub-menu item and respond accordingly, embodiments automatically navigate through the IVR system menu structure by recognizing the prompt and responding based on the pre-determined response or action. This saves the agent time on the call by automatically moving their call to the desired end point and allows them to use their time to handle other matters while waiting or on hold.

In some embodiments, the disclosure is directed to a method for automatically navigating or traversing through the prompts in an IVR system to assist a caller to accomplish the purpose or goal of their call. In one embodiment, the general form of the data processing flow and associated logic implemented as part of the method may comprise:

- Accessing an IVR system for purposes of modeling the menu structure and associated prompts;
  - The IVR system is viewed as a set of prompts arranged into menu items and sub-menu items that may be traversed from one prompt to another along a path through the system;
  - There are a finite number of paths that exist from the receipt of an incoming call to one of the possible endpoints provided by the IVR system;
  - Each prompt may consist of a question, a statement, or an instruction presented to a caller;

For each prompt or item in the IVR system, using a speech-to-text conversion technique to convert the voice prompt into a phrase or sentence in text form;

For each prompt or item, processing the text form of the phrase or sentence to determine each individual word and the part of speech that the word corresponds to (noun, verb, or adjective, as examples);

For this purpose, an automated speech-to-text service (such as those provided by Amazon or Google) may be used. A natural language understanding (NLU) software application (such as Nuance Dragon) may also be used;

For each word and its associated part of speech, a confidence level may be determined representing the confidence level in the accuracy of the determined part of speech;

The determined confidence level may also be used (or changed to another value) to set the required level of confidence for classification of a word type or identification of an entity in a prompt in order to be part of a recognized pattern and "trigger" an associated response or action;

In some embodiments, the required confidence level in the identification of one or more words or entities to result in a response or action may be expressed in the form of a "matching" rule;

Determining the word or words in a prompt that represent an entity, where an entity is a person or business name, a specific object, the subject of a sentence or phrase, a date, a dollar value, or a product name, as examples;

In one embodiment, this may be based on the parts of speech that are identified as nouns;

An entity may be identified using an external database lookup, entity directory, or entity extraction service, as examples;

In some embodiments, an "entity" represents a predefined category that it is desired to be able to recognize/classify and extract as part of the overall process of identifying patterns and the navigation structure;

Based on the identified parts of speech and entity or entities, defining a "pattern", flow, or arrangement of the words and/or parts of speech and entities in each of the prompts;

A pattern may be associated with a required confidence level for one or more of the pattern's constituent parts, where determination of the part of speech or entity is required to be performed with that confidence level for the processing of the pattern to continue to reach a pre-determined response to that pattern. Examples of the processing logic or flow that may be used to define a "pattern" and examples of such patterns are described herein;

In some embodiments, the required confidence level in the identification of one or more words or entities to result in a response or action may be expressed in the form of a "matching" rule;

Assigning or otherwise associating a desired action, response, or event with each defined pattern—this represents the automated system's (i.e., a system implementing an embodiment of the disclosed method) predetermined reply to a prompt;

Due to the finite number of menu or sub-menu items or prompts, there will be a finite number of stages in the interaction with the IVR system at which a response or action is needed to accomplish the goal of the caller;

Further, there will be a finite (although in some cases, large) number of possible paths through the menus and sub-menus to reach an endpoint of the IVR system, where the endpoint may be termination of the call, connection with a human agent, or provision of specific data, as examples;

As examples, the associated or assigned action, response, or event may be a voice response, silence, or generation of one or more DTMF tones corresponding to a key press on a keypad;

A voice response may be a spoken word, phrase, or sentence generated by a computing device, and may include data specific to the call being participated in by the automated system (such as an account number, identification of a person, or explanation, as examples);

Storing a record of each pattern or sequence and the associated action, response, or event in a data storage element accessible by the automated IVR navigation system;

A non-limiting example of a format or schema for the storage of a pattern or sequence and its desired action or response in a database is illustrated in FIG. 1(*d*);

The set of patterns and associated responses form the basis for automatically navigating through an IVR system to reach an end point at which a caller may accomplish the goal or purpose of their call;

As an example use of an embodiment of the disclosed method or system, a caller (such as an agent for a company who wishes to provide information to a business or obtain information from the business) places a call to a business that utilizes an IVR system;

The disclosed system automatically navigates or traverses the set of menu and sub-menu prompts to reach a point at which the caller obtains the assistance they seek or can provide the information they wanted to provide;

this may include speech-to-text transcription of a prompt and analysis of word type (noun or verb, as examples) and entity to generate a pattern;

matching the prompt pattern to a previously stored pattern and desired response (which represents a form of rule);

based on the match and desired response, the IVR system is navigated to an endpoint or place at which other assistance is needed;

This may include speaking with a human customer service representative, leaving a call-back number, providing an account number, or receiving a voice response that provides the caller with the information they need, as examples.

Thus, in some embodiments, the disclosed process flow includes two primary functions. A first is a process to access and model the flow or structure of prompts in an IVR system. This may include the following steps, stages, functions, or operations:

An embodiment of the disclosed system "calls" an IVR, traces through entire tree of prompts;

Each prompt is analyzed to identify its "pattern" of entities and word type (noun, verb); and Each prompt is also associated with a desired "action" or response;

A record is created and stored including the pattern, desired action or response, and associated information;

At a later time, the system calls the IVR and navigates through a set of prompts based on its previous interaction with the IVR:

- An embodiment of the disclosed system "calls" the IVR, and receives a set of prompts;
- Each prompt is speech-to-text transcribed and again analyzed to generate an associated pattern;
- The pattern determined for a prompt is matched to one of the previously stored patterns and responses for the IVR;
- Based on a match of the determined and stored patterns, and the desired response (which may include information specific to a user, such as an account number or identification), the IVR system is navigated to an endpoint or place at which other assistance is needed.

In one embodiment, the disclosure is directed to a system for automatically navigating or traversing through the prompts of an IVR system to assist a caller to accomplish the purpose or goal of their call. The system may include a set of computer-executable instructions stored in (or on) a data storage device or memory (such as a non-transitory computer-readable medium) and an electronic processor or co-processors. When executed by the processor or co-processors, the instructions cause the processor or co-processors (or a device of which they are part) to perform a set of operations that implement an embodiment of the disclosed method or methods.

In one embodiment, the disclosure is directed to a non-transitory computer readable medium containing a set of computer-executable instructions, wherein when the set of instructions are executed by an electronic processor or co-processors, the processor or co-processors (or a device of which they are part) perform a set of operations that implement an embodiment of the disclosed method or methods.

In some embodiments, the systems and methods disclosed herein may provide IVR system evaluation and generation of automated response services through a SaaS or multi-tenant platform. The platform provides access to multiple entities, each with a separate account and associated data storage. Each account may correspond to a source of a set of IVR prompts (i.e., a specific IVR system), a set of sources, or an organization, for example. Each account may access one or more services, a set of which are instantiated in their account, and which implement one or more of the methods or functions disclosed herein.

Other objects and advantages of the disclosed systems, apparatuses, and methods will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in further detail herein. However, the exemplary or specific embodiments are not intended to be limited to the particular forms described. Rather, the present disclosure covers all modifications, equivalents, and alternatives falling within the scope of the appended claims.

BRIEF DESCRIPTION OF THE DRAWINGS

Embodiments of the disclosure are described with reference to the drawings, in which:

FIG. 1(*b*) is a flow chart or flow diagram illustrating a method, process, operation, or set of functions that may be used in implementing an embodiment of the disclosure;

FIG. 1(*c*) is a diagram illustrating a method, process, operation, or set of functions that may be used in processing a voice prompt that is part of an IVR system, in accordance with an embodiment of the disclosure;

FIG. 1(*d*) is a diagram illustrating an example data record that may be used to store information regarding a prompt or prompts and that may be used in implementing an embodiment of the disclosure;

Note that the same numbers are used throughout the disclosure and figures to reference like components and features.

DETAILED DESCRIPTION

Figure 1A:
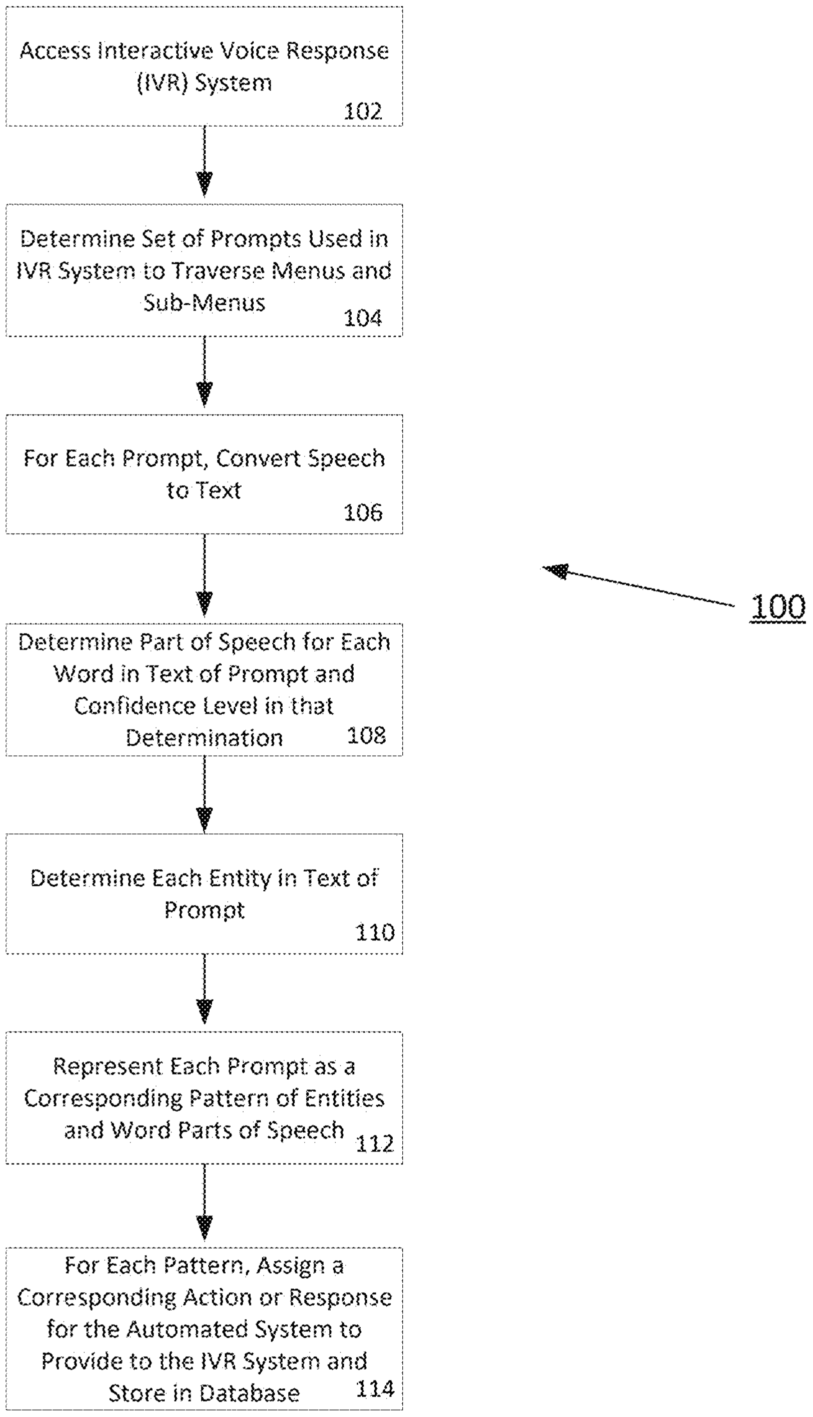
FIG. 1(*a*) is a flow chart or flow diagram illustrating a method, process, operation, or set of functions that may be used in implementing an embodiment of the disclosure.
Figure 1B:
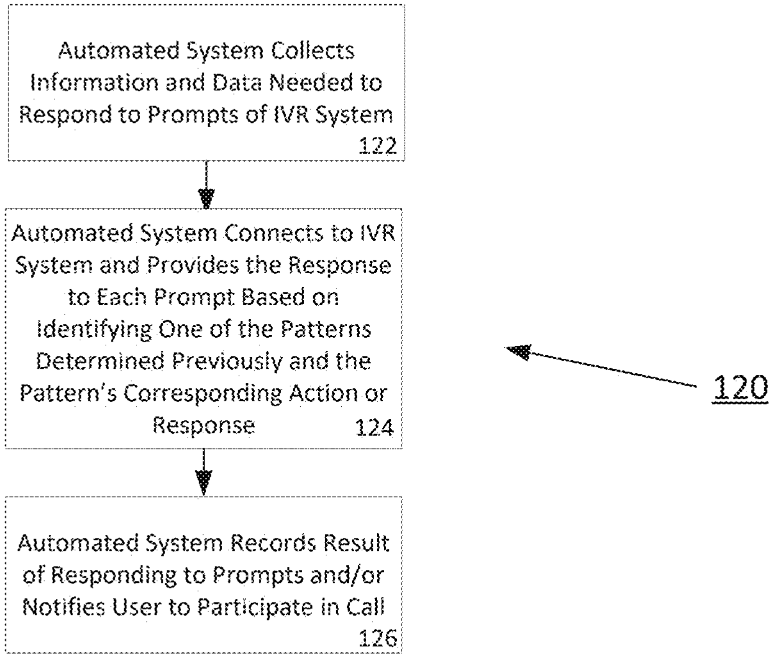
Figure 1C:
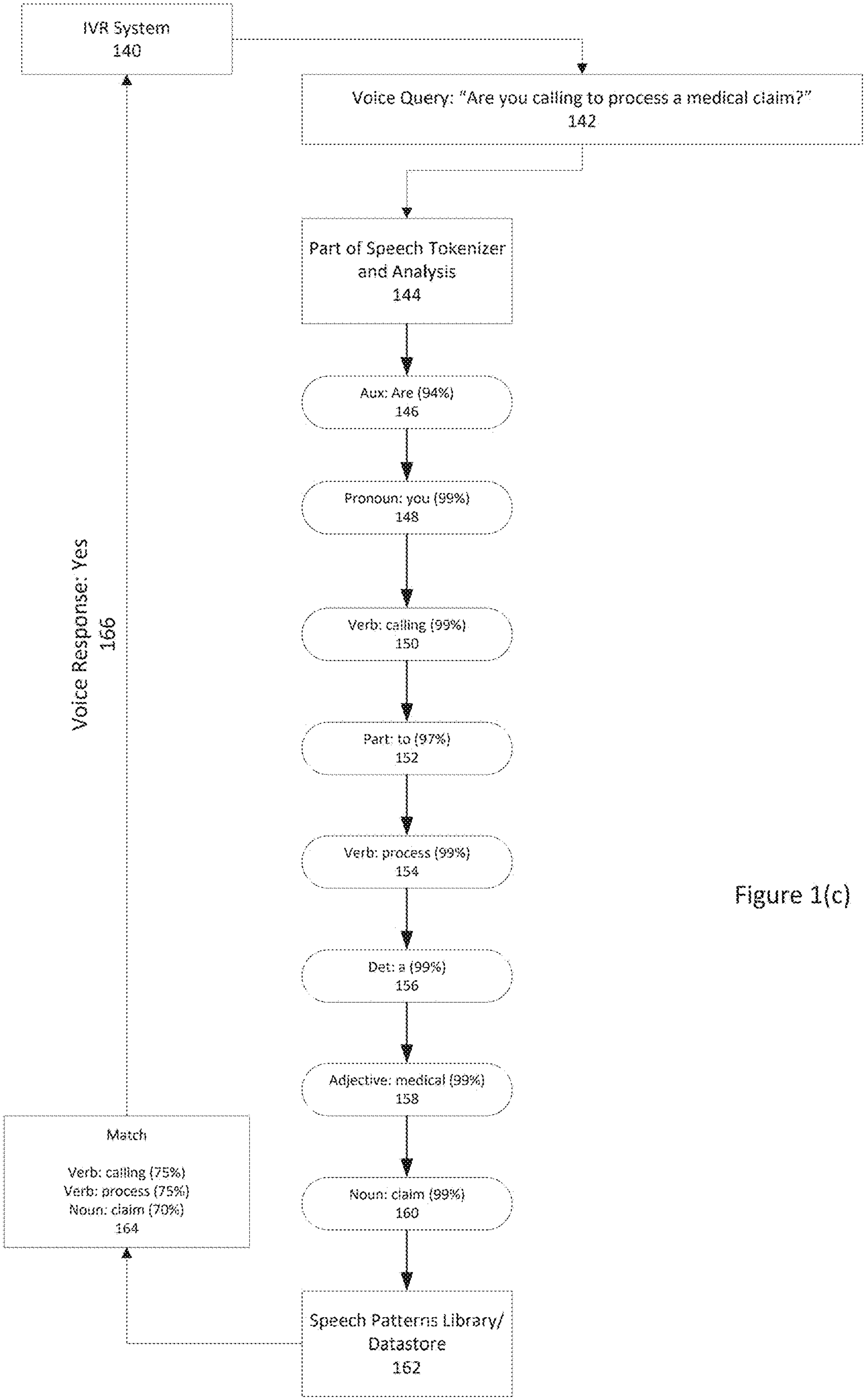
Figure 1D:
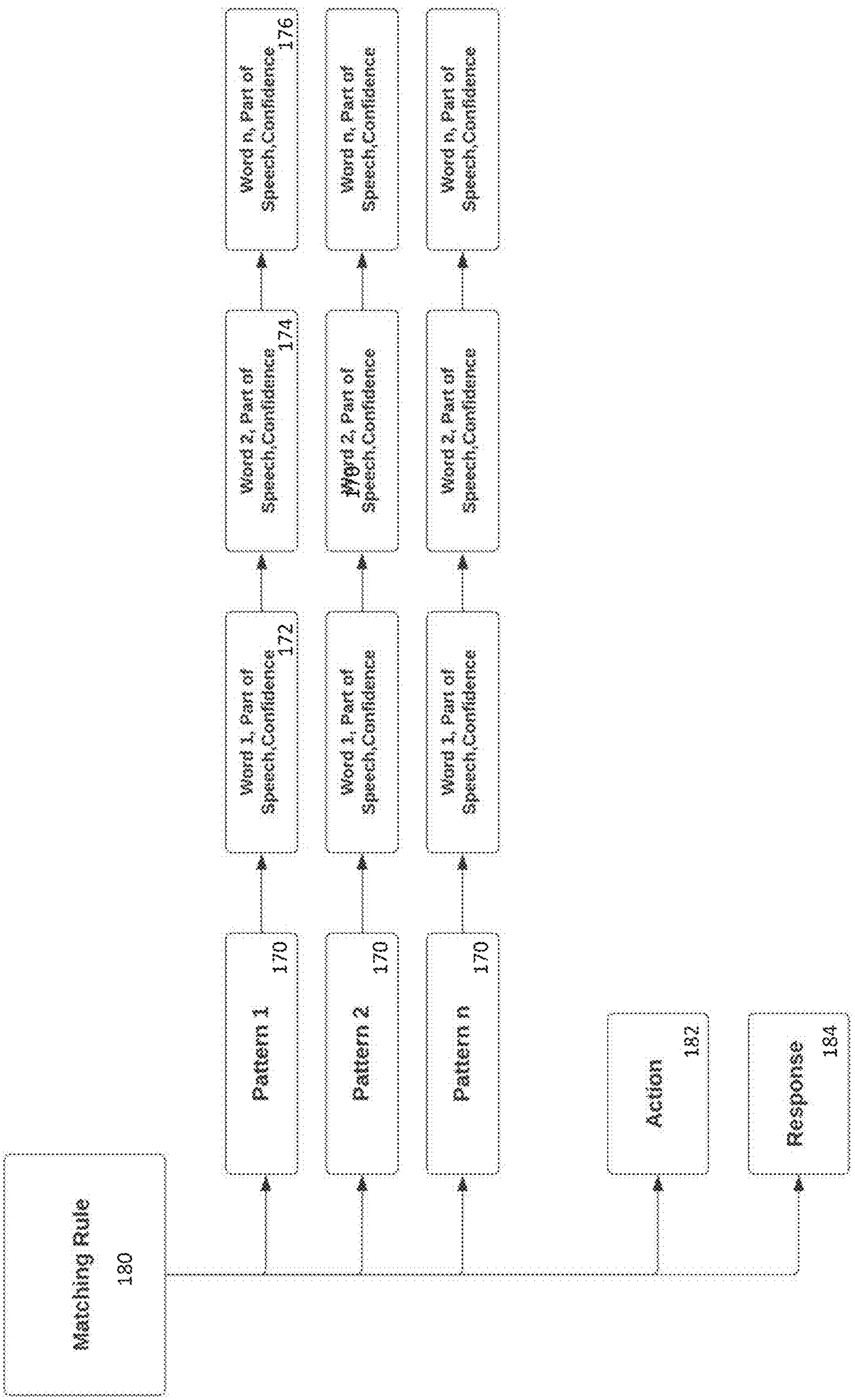

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter will be described more fully herein with reference to the accompanying drawings, which illustrate examples by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by a suitable processing element or elements (such as a processor, co-processor, microprocessor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user over a network (e.g., the Internet) through a transfer of instructions or an application that executes a set of instructions.

In some embodiments, the systems and methods disclosed herein may provide IVR system evaluation and generation of automated response services through a SaaS or multi-tenant platform. The platform provides access to multiple entities, each with a separate account and associated data storage. Each account may correspond to a source of a set of IVR prompts, a set of sources, or an organization, for example. Each account may access one or more services, a set of which are instantiated in their account, and which implement one or more of the methods or functions disclosed herein.

In some embodiments, one or more of the operations, functions, processes, or methods disclosed herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments are directed to systems, devices, and methods for automatically navigating or traversing through the prompts in an IVR system to assist a caller to accomplish a purpose or goal of their call. In some embodiments, this is accomplished by accessing the IVR system and analyzing its structure and flow of prompts to identify parts of speech, entities, and desired responses to each prompt. Each prompt is then represented as a pattern or sequence which can be recognized and responded to in a pre-determined manner. By analyzing and representing the prompts of an IVR system in this way, embodiments enable a caller to traverse a path quickly and efficiently through the prompts to a desired end point. This can save the caller time and enable them to attend to other tasks while an automated system that implements an embodiment responds to the prompts.

FIG. 1(*a*) is a flow chart or flow diagram illustrating a method, process, operation, or set of functions 100 that may be used in implementing an embodiment of the disclosure. The set of steps or stages illustrated in FIG. 1(*a*) represent an example of a process for analyzing and representing an IVR system to enable the prompts of the IVR system to be automatically responded to (and as a result, traversed to an end point) by a separate system. As shown in the figure, at step or stage 102 an IVR system is accessed. Typically, the IVR system includes a set of prompts arranged into menus and sub-menus. The response provided to each prompt determines the path followed by an incoming call through the menus and sub-menus. In one sense, the IVR system may be considered a state machine where the response to a prompt is what causes the transition from one state to another.

At step or stage 104 the IVR system is engaged with and operated (typically by executing or otherwise examining its sequence of prompts) to determine each prompt that is used as part of the system to traverse the menus and sub-menus. In one embodiment, this may be performed by a computer program that determines each option provided by the IVR system at each prompt and uses that information to determine the possible paths through the prompts, until all available prompts have been identified. In another example, the process of determining the set of prompts used by the IVR system may be performed with the assistance of a person who tries all combinations of responses to prompts until an end point of the IVR system has been reached for each combination. In general, this part of the process involves trying each available option to learn how that leads to another choice or endpoint.

A result of performing step or stage 104 is a list of all prompts that are part of the IVR system and in some cases also the organization of the prompts into menus and sub-menus. In addition, in some embodiments, a map or other representation of the prompts may be constructed that can be used to identify each path through the IVR system to an end point. The map or representation may be generated during a training phase for the disclosed system. For example, given an IVR system that a caller wants to be able to navigate efficiently, the disclosed methods may step through each prompt and map the menu structure automatically, and record each prompt. This enables configuration of the automated IVR navigation process and the delivery of the disclosed service.

In some embodiments, the IVR path determination and end point data may be used in a training process for the automated IVR navigation system disclosed, as part of the identification of the parts/patterns of speech that comprise a prompt. As an example, the prompts, identified entities or word types, navigation paths, and endpoints may be used (in part or in whole) to train a classification model (i.e., a machine learning model) used to identify paths, common patterns, and in some cases infer meanings of prompts. For example, while the order of words and identification of entity and word types is often sufficient to create a recognizable pattern, in some situations the context may also provide a way to distinguish word groups or prompts. As described, the speech parts, entities, and order of words are used to generate the patterns or sequences disclosed herein that are used to determine the appropriate response(s) to a prompt, based on the structure of the prompt and a confidence level in recognizing the elements or components of a pattern.

As an example, verb-noun-noun combinations are useful indicators of a pattern. Looking at just the verb "buy" in a sentence provides an idea of context and intent. Identifying the noun "Airline" or "Ticket" in a sentence also provides context to understand the intent. However, the combination of a verb-noun-noun such as "Buy Airline Ticket" provides even greater context and indication of an intent, and hence a clearer indication of a desired response.

At step or stage 106 each prompt is converted from the speech used in the prompt to text. This may be accomplished by a suitable speech-to-text conversion model or process.[1] Next, at step or stage 108 the part of speech corresponding to each word in the text obtained from converting a prompt is determined. In some embodiments, a confidence level in the part of speech corresponding to a word may also be determined.[2]

At step or stage 110, the entity or entities that are part of each prompt are determined. In this context, an entity may be a noun representing a person, a place, a company, a product line, or a date, as examples. In some embodiments, the entities in a prompt may be determined using an entity resolution service, Natural Language Understanding (NLU) service, or accessing and performing a lookup in a database.

Each prompt is represented as a "pattern" or sequence of entities and word types (parts of speech), as suggested by step or stage 112. Each pattern may comprise multiple word types and entities, with the IVR system expecting or requiring a response to each prompt. Examples of such patterns are provided in this document.

For each identified pattern, a corresponding action or response is assigned, as suggested by step or stage 114. The corresponding action or response may comprise speech, a keypress or presses on a keypad, an input of data, a hang-up, or a call transfer, as examples. The patterns (parts of speech and entities) and associated responses are stored in a data storage element and may be accessed when needed to interact with the IVR system. As an example, FIG. 1(*d*) illustrates a data record or schema including each pattern and an associated response that may be stored in a database for use by an embodiment of the disclosed system.

[1] This function or processing may be performed using an in-house ASR System (Automated speech recognition) or leveraging one of the major cloud-provided ASR systems, such as AWS or Google Cloud service.

[2] This function or processing may be performed using open-source solutions such as Open NLU or services provided by the cloud vendors such as AWS or Google.

FIG. 1(*b*) is a flow chart or flow diagram illustrating a method, process, operation, or set of functions 120 that may be used in implementing an embodiment of the disclosure. The set of steps or stages illustrated in FIG. 1(*b*) represent an example of a process for an embodiment of the disclosed system to interact with the IVR system analyzed in the steps or stages of FIG. 1(*a*) to enable a caller or user to efficiently navigate through the prompts of the IVR system and accomplish their desired goal.

As shown in FIG. 1(*b*), at step or stage 122 an embodiment of the disclosed system may collect information and data which will be used as part of responding to the prompts of an IVR system. The information or data may be specific to a person (such as a patient or customer name or identifier), a product or service (such as a product name), a serial number, a claim number or identifier, an email address, a monetary amount, a name, or an event (such as a day or time), as examples. The information or data may be input by a person or acquired from a database in response to instructions provided by a person. The information or data may be associated with a specific prompt by inserting the information or data into a pattern associated with the prompt at the appropriate location. The information or data may take the form of a keypress, a spoken word or phrase, or other form of representing the information or data. If not inserted into a pattern or sequence associated with a prompt, the information or data to be used to respond to a prompt may be stored separately with an identifier or index that corresponds to the prompt and/or to a location in the prompt.

At step or stage 124, the automated system (or another system coupled to it) connects to the IVR system, typically by placing a call. As the IVR system plays a prompt, the automated system responds with the corresponding action or response by identifying the pattern of the prompt and providing the action or response that is included as part of (or associated with) the pattern. This allows the automated system to traverse or navigate through the IVR system without human intervention until it reaches an end point at which the automated system has performed a desired task (such as providing information to the IVR or obtaining information from the IVR) or at which a human can be notified to be available to interact with the IVR system or with a human on the call, as suggested by step or stage 126. In some embodiments, a record of the traversal of the IVR system (i.e., prompts and responses) may be created and stored to provide an auditable trail of the interactions with the IVR system.

FIG. 1(*c*) is a diagram illustrating a method, process, operation, or set of functions that may be used in processing a voice prompt that is part of an IVR system, in accordance with an embodiment of the disclosure. The set of steps or stages illustrated in FIG. 1(*c*) represent an example of how a prompt that is presented by an IVR system 140 may be analyzed to identify the parts of speech for the words in the prompt, the pattern of the prompt, and a desired response to the prompt. As shown in the figure, a voice prompt 142 may be analyzed by a process that executes a tokenizer and speech analyzer 144 to determine a part of speech associated with each word in the prompt.

Each determination may be associated with a corresponding degree of confidence by the tokenizer and speech analyzer 144, as suggested by the parts of speech for the words "Are" (146, identified as an auxiliary part of speech with a confidence level of 94%), "you" (148, identified as a pronoun with a confidence level of 99%), and "calling" (150, identified as a verb with a confidence level of 99%), and the associated confidence levels (expressed as a percentage) in the figure for the other words of the IVR generated phrase, "Are you calling to process a medical claim?". In one embodiment, speech tokenizer and analyzer 144 may comprise a speech-to-text conversion process, and a process to identify a part of speech (and/or an entity) in a set of text.

In some embodiments, the confidence level represents (a) a confidence in the part of speech or entity having been correctly identified by the model or process used to identify the part of speech or entity, and/or (b) the confidence level required when processing an element or component of a prompt at a later time as part of identifying a pattern and associated response or action (which, as noted may be incorporated into a matching rule or logic).

The identified parts of speech are then converted to a speech pattern or sequence of speech/word types and stored in a "library" of speech patterns 162. For a "match" of a prompt to a pattern to occur, certain speech parts and words may be required to be identified in a prompt with a specified degree or level of confidence, as suggested by the Match process 164. In Match process 164, a part of speech (e.g., Verb), the word for which the part of speech applies (e.g., calling) and a required degree of confidence (e.g., 75%) are indicated. When a match to a pattern is identified in a prompt provided by an IVR system (where the set of patterns are generated using the steps or stages described with reference to FIG. 1(*a*)), a previously determined response or action 166 (in this example, the word "Yes") is generated by the automated system and provided to the IVR system 140. This will cause the IVR system to progress or move to the next prompt in the sequence of prompts.

FIG. 1(*d*) is a diagram illustrating an example data record that may be used to store information regarding a prompt or prompts and that may be used in implementing an embodiment of the disclosure. As shown in the figure, a set of IVR prompts may include a set of patterns 170 (shown as Pattern 1, Pattern 2, . . . . Pattern n in the figure) each of which may consist of a set of words, with each word associated with a determined part of speech, and a desired confidence level in that determination for recognition of the pattern. This information is indicated as Word 1, Part of Speech, Confidence 172; Word 2, Part of Speech, Confidence 174; and Word n, Part of Speech, Confidence 176 for each Pattern 170.

In some embodiments, a matching rule or set of conditions 180 may be used to determine which of several patterns should be selected as the correct one corresponding to a prompt when an IVR system is later accessed. For example, a matching rule may present conditions necessary to conclude that a prompt matches a specific pattern (such as a degree of confidence required in one or more of the identified word parts or entities). Depending upon the result of the matching rule, an action may be taken 182 (such as generating a tone corresponding to a keypress, inserting a pause, or hanging up) or an auditory response may be provided 184 (such as specific information or one or more words).

Figure 2:
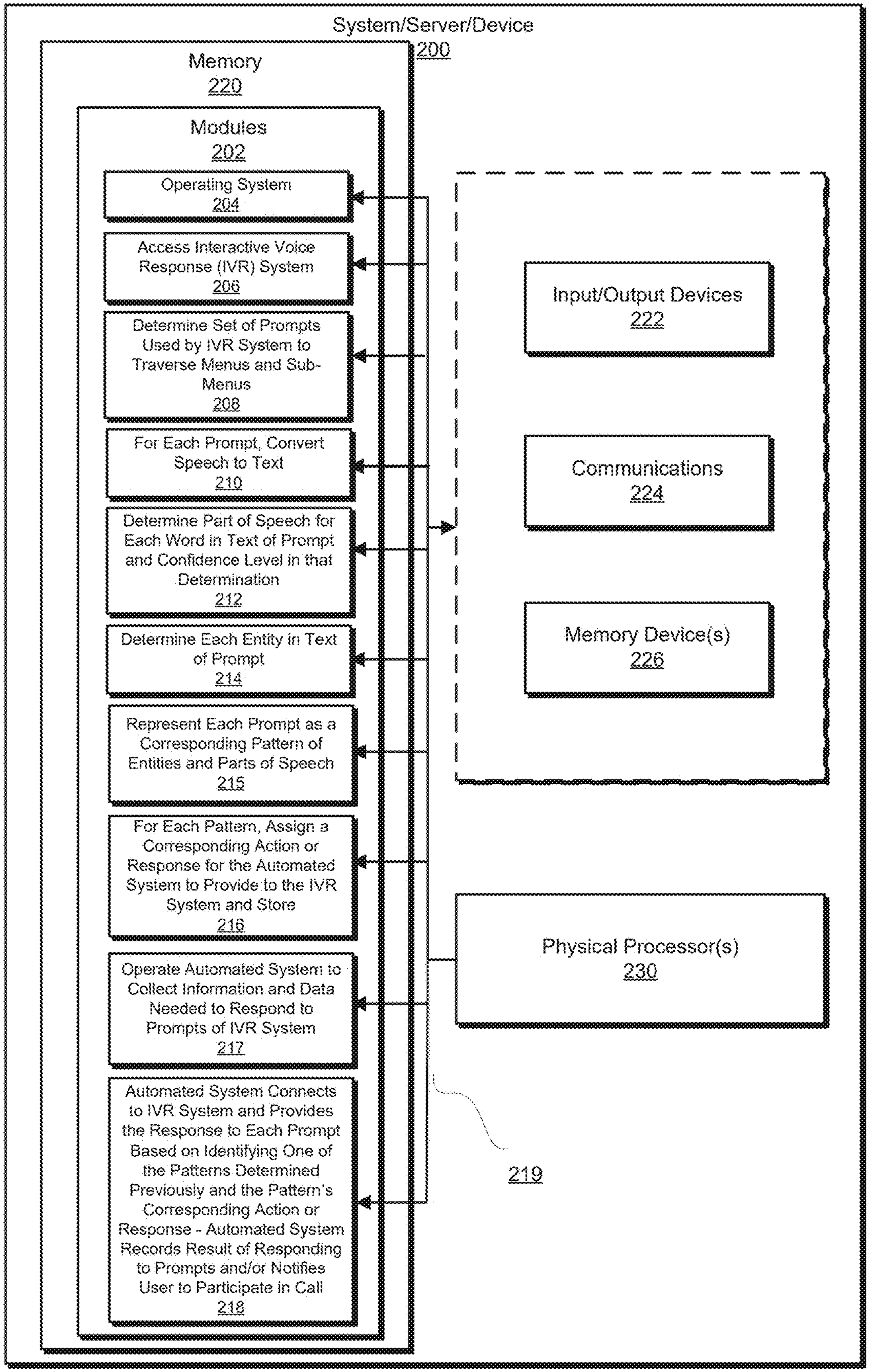
FIG. 2 is a diagram illustrating elements or components that may be present in a computing device or system configured to implement a method, process, function, or operation in accordance with an embodiment of the system and methods disclosed herein.

FIG. 2 is a diagram illustrating elements or components that may be present in a computing device, server, or system 200 configured to implement a method, process, function, or operation in accordance with some embodiments. In some embodiments, the disclosed system and methods may be implemented in the form of an apparatus that includes a processing element and a set of computer-executable instructions stored in (or on) a non-transitory computer-readable medium. The executable instructions may be part of a software application and arranged into a software architecture.

In general, an embodiment of the disclosure may be implemented using a set of software instructions that are designed to be executed by a suitably programmed processing element (such as a GPU, TPU, CPU, microprocessor, processor, controller, state machine, or other form of computing device, as examples). In a complex application or system such instructions are typically arranged into "modules" with each such module typically performing a specific task, process, function, or operation. The entire set of modules may be controlled or coordinated in their operation by an operating system (OS) or other form of organizational platform.

The application modules and/or sub-modules may include any suitable computer-executable code or set of instructions (e.g., as would be executed by a suitably programmed processor, microprocessor, CPU, or GPU), such as computer-executable code corresponding to a programming language. For example, programming language source code may be compiled into computer-executable code. Alternatively, or in addition, the programming language may be an interpreted programming language such as a scripting language.

As shown in FIG. 2, system 200 may represent a server or other form of computing or data processing device. Modules 202 each contain a set of executable instructions, where when the set of instructions are executed by a suitable electronic processor (such as that indicated in the figure by "Physical Processor(s) 230"), system (or server or device) 200 operates to perform a specific process, operation, function, or method. Modules 202 may contain one or more sets of instructions for performing a method or function described with reference to the Figures, and the descriptions of the functions and operations provided in the specification. The modules may include those illustrated but may also include a greater number or fewer number than those illustrated. Further, the modules and the set of computer-executable instructions that are contained in the modules may be executed by the same processor or by more than a single processor.

Modules 202 are stored in a memory 220, which typically includes an Operating System module 204 that contains instructions used (among other functions) to access and control the execution of the instructions contained in other modules. The modules 202 in memory 220 are accessed for purposes of transferring data and executing instructions by use of a "bus" or communications line 219, which also serves to permit processor(s) 230 to communicate with the modules for purposes of accessing and executing a set of instructions. Bus or communications line 219 also permits processor(s) 230 to interact with other elements of system 200, such as input or output devices 222, communications elements 224 for exchanging data and information with devices external to system 200, and additional memory devices 226.

Each module or sub-module may correspond to a specific function, method, process, or operation that is implemented by the module or sub-module. Each module or sub-module may contain a set of computer-executable instructions that when executed by a programmed processor or processors cause the processor or processors (or a device or devices in which they are contained) to perform the specific function, method, process, or operation. Such function, method, process, or operation may include those used to implement one or more aspects of the disclosed system and methods, such as for:

- Accessing an Interactive Voice Response System (IVR) (as suggested by module 206);
- Determining a Set of Prompts Used by the IVR System to Traverse Menus and Sub-Menus (module 208);
- For Each Prompt, Converting the Speech in the Prompt to Text (module 210);
- Determining a Part of Speech for Each Word in the Text of a Prompt and a Confidence Level in that Determination (module 212);
- Determining Each Entity in the Text of a Prompt (module 214);
- Represent Each Prompt as a Corresponding Pattern of Entities and Parts of Speech (module 215);
- For Each Pattern, Assign a Corresponding Action or Response for an Automated System to Provide to the IVR System (module 216);
  - The pattern(s) and corresponding action(s) or response (s) (which may include providing user-specific information) may then be stored in a database—an example of a database format or schema for such information is illustrated in FIG. 1(*d*);
  - In some embodiments, the required confidence level in the identification of one or more words or entities to result in a response or action may be expressed in the form of a "matching" rule;
- Operate Automated System to Collect Information and Data Needed to Respond to Prompts of IVR System (module 217); and
- Automated System Connects to IVR System and Provides the Response to Each Prompt Based on Identifying One of the Patterns Determined Previously and the Pattern's Corresponding Action or Response (module 218);
  - As described, in some embodiments, this may include:
    - speech-to-text transcription of a prompt and analysis of word type (noun or verb, as examples) and entity to generate a pattern;
    - matching the prompt pattern to a previously stored pattern and desired response (which may be represented as a form of rule);
    - based on the match and desired response, the IVR system is navigated to an endpoint or place at which other assistance is needed;
  - This may include speaking with a human customer service representative, leaving a call-back number, providing an account number, or receiving a voice response that provides the caller with the information they need, as examples;
  - The Automated System Records the Result of Responding to the Prompts and/or Notifies a User to Participate in a Call.

As mentioned, each module may contain instructions which when executed by a programmed processor cause an apparatus (such as a server or client device) to perform the specific function or functions. The apparatus may be one or both of a client device or a remote server or platform. Therefore, a module may contain instructions that are performed by the client device, the server or platform, or both.

The processing performed by an embodiment of the disclosed system and methods can interact with almost any IVR system, although it may not be as accurate or efficient when used to navigate an IVR system that it has not been trained on. In such a case, if there is sufficient overlap or commonality in the structure and prompts, then the disclosed approach will still be able to provide benefits.

As disclosed, in some embodiments, the parts of speech and entities in a prompt are represented as a "pattern" or sequence of word types (verb, noun, or adjective, as examples). Each pattern can be used to identify specific language that is presented in a particular order and includes an instruction for how to properly respond to the pattern. For a typical IVR system, the automated navigation service disclosed herein may comprise hundreds of such patterns. A pattern may be considered a "conversational phase" that represents one stage of a conversation between a user and the IVR system that the user engages in to perform a desired task.

Note that although it is possible to call an IVR system, record a prompt, and match it to a previously recorded set of prompts for the IVR system, and based on the match access the desired response to the prompt, this approach is prone to error. Such an approach is a form of hard coding responses to specific prompts, and this approach is fragile and error prone, as minor changes to the IVR system prompts cannot be accommodated. Further, minor variations in the speech recognition processing (which are common) may lead to errors, and such a system could not handle anything it is not programed to handle. These are some of the reasons why the disclosed approach of identifying word types and patterns is more likely to be reliable and accurate and be capable of responding to changes in the structure or wording of a prompt.

As non-limiting examples, below are several "patterns" of words that might be recognized by an embodiment, and based on identifying a pattern, the disclosed system may generate the response indicated. In the following examples, POSSeriesMatch stands for "Parts of Speech Series Match", and in this context the system is identifying a pattern of words from an IVR prompt that fits this series of words, matches the type of word, was found with more than the indicated confidence level, and in the specified order:

```
ConversationalPhase
  Name: Question-"Do you want to connect to an advocate?"
  Action: Respond
  Response: Yes Please
  POSSeriesMatch (parts of speech series match)
    Type: Verb
    Word: Want
    Confidence: 0.90
    Eno
  POSSeriesMatch
    Type: Verb
    Word: Connect
    Confidence: 0.90
    End
  POSSeriesMatch
    Type: Noun
    Word: Advocate
    Confidence: 0.90
    End
End ConversationalPhase
ConversationalPhase
  Name: use case—"Would you like to hear this again?"
  Action: Respond
  Response: No
  POSSeriesMatch
    Type: Verb
    Word: Hear
    Confidence: 0.75
    End
  POSSeriesMatch
    Type: ADV
    Word: Again
    Confidence: 0.75
    End
End ConversationalPhase
ConversationalPhase
  Name: Menu item (prompt) for directing caller to either
    medical or prescription assistance—prompt may be
    of form "are you calling for assistance with a medi-
    cal or prescription issue?"
  Action: Respond
  Response: Medical
  POSSeriesMatch
    Type: Verb
    Word: Calling
    Confidence: 0.75
    End
  POSSeriesMatch
    Type: Noun
    Word: Call
    Confidence: 0.75
    End
  POSSeriesMatch
    Type: PROPN
    Word: Medical
    Confidence: 0.75
    End
End ConversationalPhase
ConversationalPhase
  Name: prompt of form "Please stay on the line"
  Action: Silence
  Response: (nothing)
  POSSeriesMatch
    Type: Verb
    Word: stay
    Confidence: 0.85
    End
  POSSeriesMatch
    Type: Noun
    Word: Line
    Confidence: 0.85
    End
End ConversationalPhase
ConversationalPhase
  Name: BCBS (Blue Cross Blue Shield) Use Case for
    medical or claims press two
  Action: Respond
  MultiMessage: 0
  Response: Two
  POSSeriesMatch
    Type: ADJ
    Word: Medical
    Confidence: 0.75
    End
  POSSeriesMatch
    Type: Noun
```

Word: Claims
Confidence: 0.75
End
POSSeriesMatch
Type: Noun
Word: Press
Confidence: 0.65
End
POSSeriesMatch
Type: NUM
Word: Two
Confidence: 0.75
End
End ConversationalPhase In some embodiments, the confidence level noted in the description of a pattern (such as the confidence level of 0.75 for the word/number "two" in the above example) represents the level of confidence needed in the identification of that word/number for that element or component of a prompt to be matched to a pattern. Similarly, each element or component of a prompt would need to be identified with the indicated confidence level for an entire pattern to be matched and for the associated response or action to be implemented.

As mentioned, in some embodiments, the systems and methods disclosed herein may provide IVR system evaluation and generation of automated response services through a SaaS or multi-tenant platform. The platform provides access to multiple entities, each with a separate account and associated data storage. Each account may correspond to a source of a set of IVR prompts, a set of sources, or an organization, for example. Each account may access one or more services, a set of which are instantiated in their account, and which implement one or more of the methods or functions disclosed herein.

Figure 3:
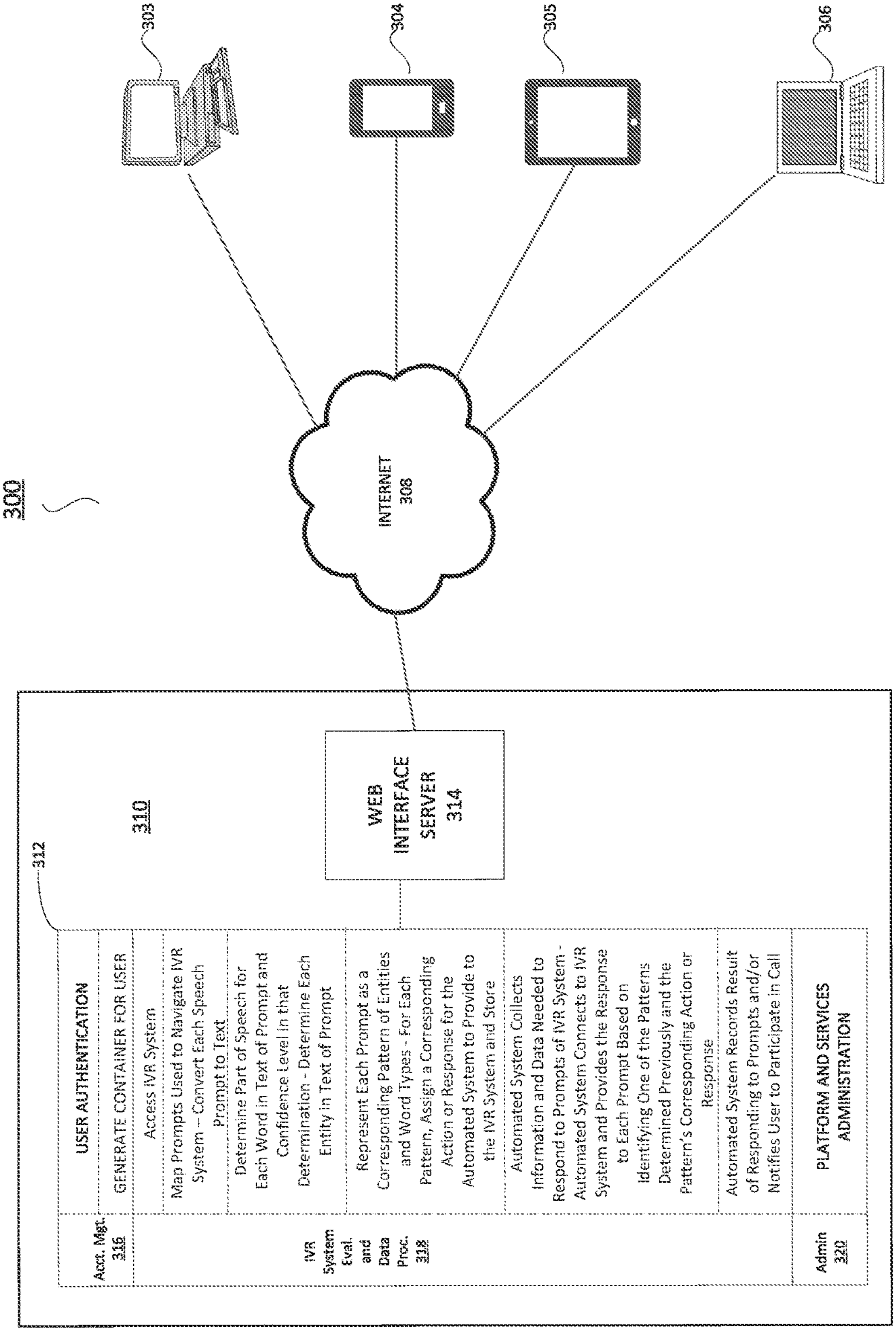
FIGS. 3-5 are diagrams illustrating an architecture for a multi-tenant or SaaS platform that may be used in implementing an embodiment of the systems and methods disclosed herein.
Figure 4:
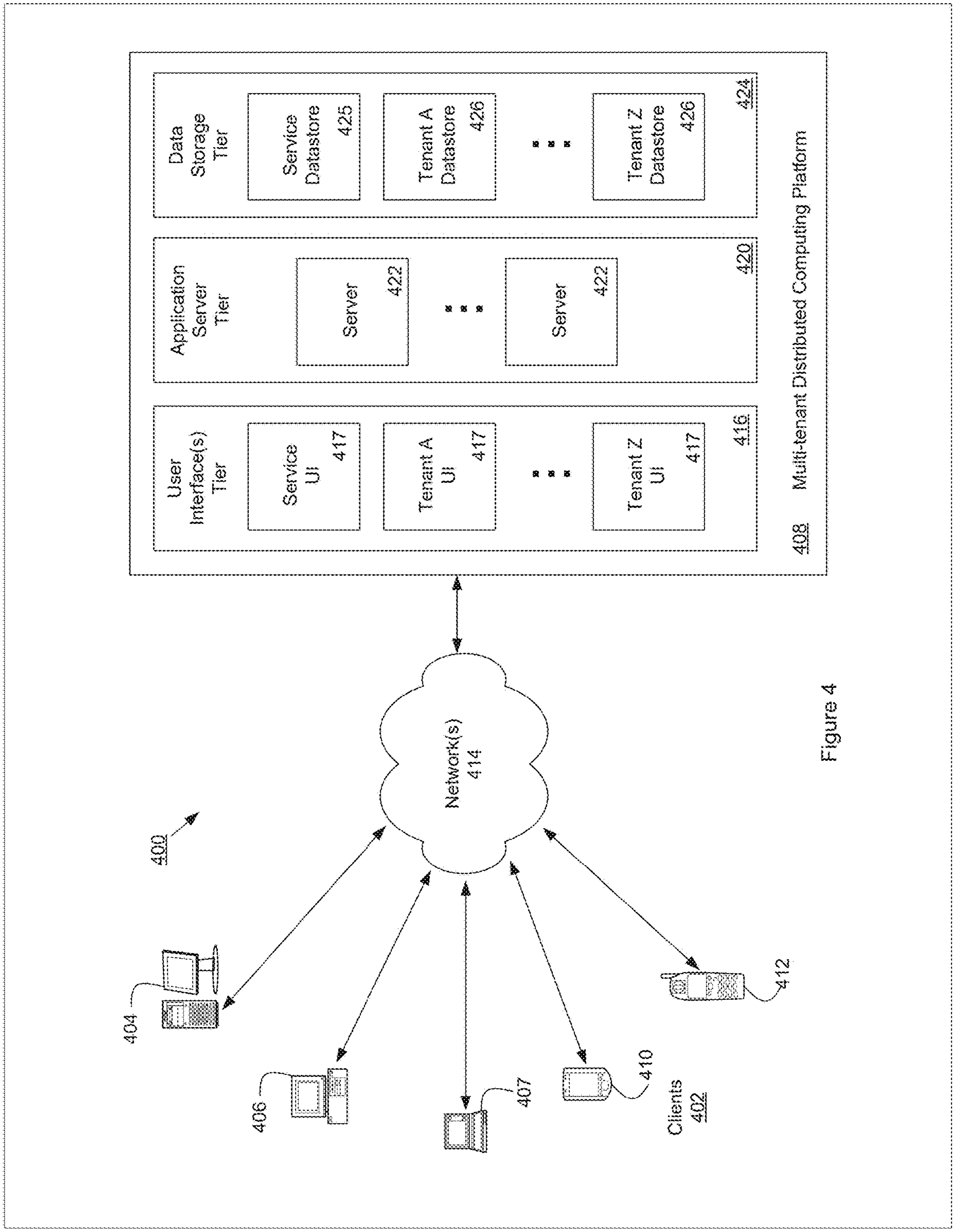
Figure 5:
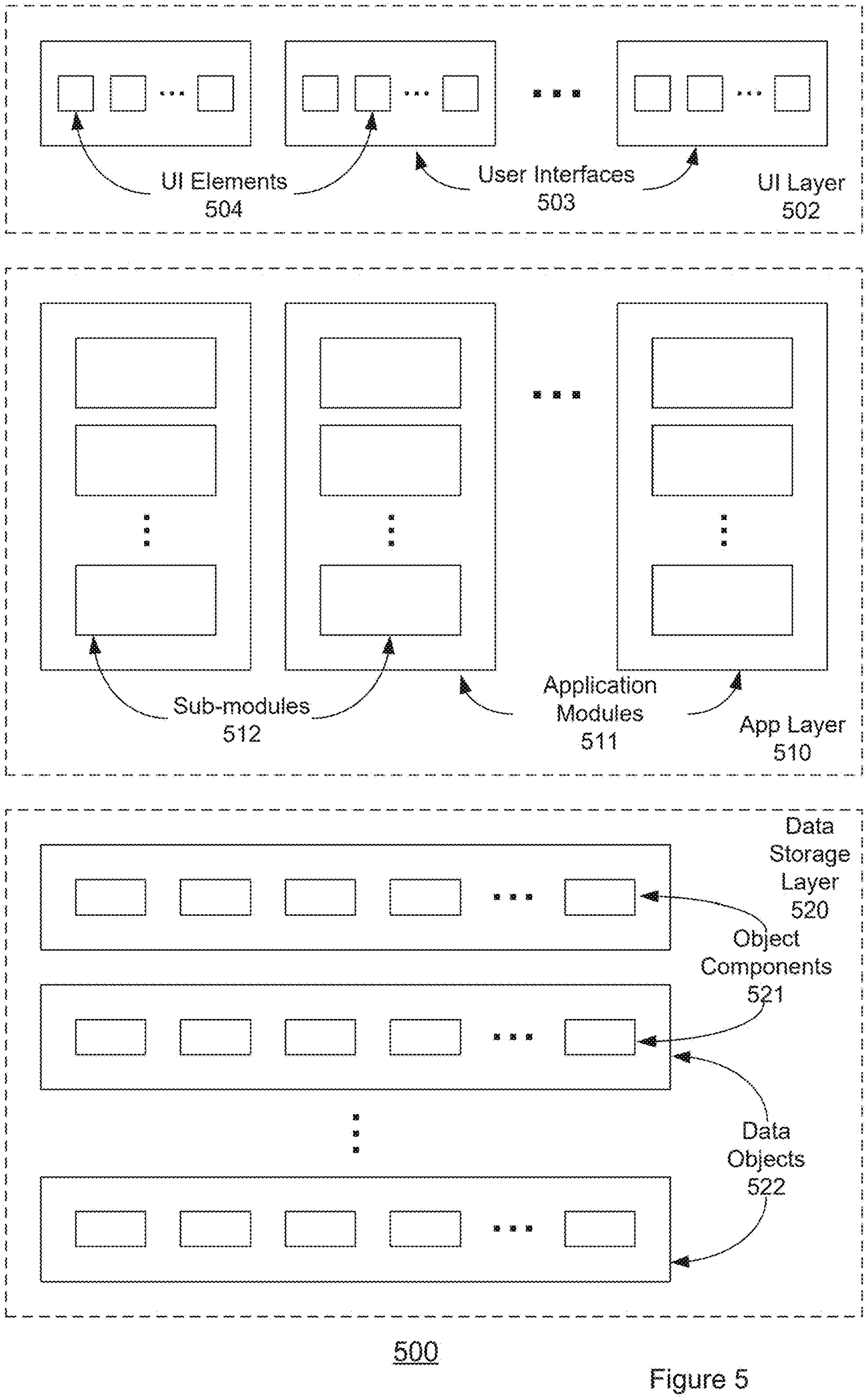

FIGS. 3-5 are diagrams illustrating an architecture for a multi-tenant or SaaS platform that may be used in implementing an embodiment of the systems and methods disclosed herein. FIG. 3 is a diagram illustrating a SaaS system in which an embodiment of the disclosure may be implemented. FIG. 4 is a diagram illustrating elements or components of an example operating environment in which an embodiment of the disclosure may be implemented. FIG. 5 is a diagram illustrating additional details of the elements or components of the multi-tenant distributed computing service platform of FIG. 4, in which an embodiment of the disclosure may be implemented.

In some embodiments, the system or service(s) described herein may be implemented as micro-services, processes, workflows, or functions performed in response to a user request. The micro-services, processes, workflows, or functions may be performed by a server, data processing element, platform, or system. In some embodiments, the services may be provided by a service platform located "in the cloud". In such embodiments, the platform is accessible through APIs and SDKs. The described IVR system evaluation processing and services may be provided as micro-services within a platform for each of multiple users or companies. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 3-5 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the data processing and IVR system evaluation methodology disclosed herein.

Although in some embodiments, a platform or system of the type illustrated in FIGS. 3-5 may be operated by a 3$^{rd}$ party provider to provide a specific set of business-related applications, in other embodiments, the platform may be operated by a provider and a different business may provide the applications or services for users through the platform. For example, some of the functions and services described with reference to FIGS. 3-5 may be provided by a 3$^{rd}$ party with the provider of the applications or services maintaining an account on the platform for each company or business using the provider's services or applications.

FIG. 3 is a diagram illustrating a system 300 in which an embodiment of the disclosure may be implemented or through which the disclosed functionality may be accessed. In accordance with the advantages of an application service provider (ASP) hosted business service system (such as a multi-tenant data processing platform), users of the services/functions disclosed herein may comprise individuals, businesses, stores, or organizations, as examples. A user may access the services using a suitable client, including but not limited to desktop computers, laptop computers, tablet computers, scanners, or smartphones, as examples. Users interface with the service platform across the Internet 308 or another suitable communications network or combination of networks. Examples of suitable client devices include desktop computers 303, smartphones 304, tablet computers 305, or laptop computers 306.

System 310, which may be hosted by a third party, may include a set of services 312 and a web interface server 314, coupled as shown in FIG. 3. It is to be appreciated that either or both services 312 and the web interface server 314 may be implemented on one or more different hardware systems and components, even though represented as singular units in FIG. 3. Services 312 may include one or more functions or operations for the evaluation and development of a set of operations to enable automated navigation through an IVR system, and related data processing, as disclosed herein.

In some embodiments, the set of services or applications available to a company or user may include one or more that perform the functions and methods disclosed herein and described with reference to the figures. As examples, in some embodiments, the set of applications, functions, operations or services made available through the platform or system 310 may include:

- account management services 316, such as
  - a process or service to authenticate a person wishing to access the services/applications available through the platform (such as credentials or proof of purchase, verification that the customer has been authorized by a company to use the services, etc.);
  - a process or service to generate a container or instantiation of the services, methodology, applications, functions, and operations described, where the instantiation may be customized for a particular user or company; and
  - other forms of account management services;
- a set 318 of data processing services, applications, elements, operations, or functionality, such as a process or service to:
  - Access an Interactive Voice Response System (IVR);
  - Determine a Set of Prompts Used in the IVR System to Traverse Menus and Sub-Menus;

- For Each Prompt, Convert the Speech Prompt to Text;
- Determine a Part of Speech for Each Word in the Text of the Prompt and a Confidence Level in that Determination;
- Determine Each Entity in the Text of the Prompt;
- Represent Each Prompt as a Corresponding Pattern of Entities and Parts of Speech;
- For Each Pattern, Assign a Corresponding Action or Response for an Automated System to Provide to the IVR System;
  - Store a data record including each pattern and associated action or response in a database in a format such as that illustrated in FIG. 1(*d*);
  - In some embodiments, the required confidence level in the identification of one or more words or entities to result in a response or action may be expressed in the form of a "matching" rule;
- Enable the Automated System to Collect Information and Data Needed to Respond to the Prompts of the IVR System;
- Automated System Connects to the IVR System and Provides the Response to Each Prompt Based on Identifying One of the Patterns Determined Previously and the Pattern's Corresponding Action or Response. This may include:
  - speech-to-text transcription of a prompt and analysis of word type (noun or verb, as examples) and entity to generate a pattern;
  - matching the prompt pattern to a previously stored pattern and desired response (which may be represented as a form of rule);
  - based on the match and desired response, the IVR system is navigated to an endpoint or place at which other assistance is needed;
    - this may include speaking with a human customer service representative, leaving a call-back number, providing an account number, or receiving a voice response that provides the caller with the information they need, as examples;
- Automated System Records Result of Responding to Prompts and/or Notifies User to Participate in a Call (if needed); and administrative services 320, such as

- a process or services to enable the provider of the data processing services and/or the platform to administer and configure the processes and services provided to users.

The platform or system shown in FIG. 3 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 4 is a diagram illustrating elements or components of an example operating environment 400 in which an embodiment of the disclosure may be implemented. As shown, a variety of clients 402 incorporating and/or incorporated into a variety of computing devices may communicate with a multi-tenant service platform 408 through one or more networks 414. For example, a client may incorporate and/or be incorporated into a client application (e.g., software) implemented at least in part by one or more of the computing devices. Examples of suitable computing devices include personal computers, server computers 404, desktop computers 406, laptop computers 407, notebook computers, tablet computers or personal digital assistants (PDAs) 410, smart phones 412, cell phones, and consumer electronic devices incorporating one or more computing device components, such as one or more electronic processors, microprocessors, central processing units (CPU), or controllers. Examples of suitable networks 414 include networks utilizing wired and/or wireless communication technologies and networks operating in accordance with any suitable networking and/or communication protocol (e.g., the Internet).

The distributed computing service/platform (which may also be referred to as a multi-tenant data processing platform) 408 may include multiple processing tiers, including a user interface tier 416, an application server tier 420, and a data storage tier 424. The user interface tier 416 may maintain multiple user interfaces 417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as examples. Each application server or processing tier 422 shown in the figure may be implemented with a set of computers and/or components including computer servers and processors, and may perform various functions, methods, processes, or operations as determined by the execution of a software application or set of instructions. The data storage tier 424 may include one or more data stores, which may include a Service Data store 425 and one or more Tenant Data stores 426. Data stores may be implemented with any suitable data storage technology, including structured query language (SQL) based relational database management systems (RDBMS).

Service Platform 408 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 422 that are part of the platform's Application Server Tier 420. As noted with regards to FIG. 3, the platform system shown in FIG. 4 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the data processing and model training described herein) are provided to users, with each company/business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 5 is a diagram illustrating additional details of the elements or components of the multi-tenant distributed computing service platform of FIG. 4, in which an embodiment of the disclosure may be implemented. The software architecture shown in FIG. 5 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

The example architecture 500 includes a user interface layer or tier 502 having one or more user interfaces 503. Examples of such user interfaces include graphical user interfaces and application programming interfaces (APIs). Each user interface may include one or more interface elements 504. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 510 may include one or more application modules 511, each having one or more sub-modules 512. Each application module 511 or sub-module 512 may correspond to a function, method, process, or operation that is implemented by the module or sub-module (e.g., a function or process related to providing business related data processing and services to a user of the platform). Such function, method, process, or operation may include those used to implement one or more aspects of the inventive system and methods, such as for one or more of the processes, services, or functions described with reference to the Figures or otherwise disclosed herein:

- Access an Interactive Voice Response System (IVR);
- Determine a Set of Prompts Used in the IVR System to Traverse Menus and Sub-Menus;
- For Each Prompt, Convert the Speech Prompt to Text;
- Determine a Part of Speech for Each Word in Text of the Prompt and a Confidence Level in that Determination;
- Determine Each Entity in the Text of the Prompt;
- Represent Each Prompt as a Corresponding Pattern of Entities and Parts of Speech;
- For Each Pattern, Assign a Corresponding Action or Response for an Automated System to Provide to the IVR System;
  - Store a data record including each pattern and associated action or response in a database in a format such as that illustrated in FIG. 1(*d*);
  - In some embodiments, the required confidence level in the identification of one or more words or entities to result in a response or action may be expressed in the form of a "matching" rule;
- Enable the Automated System to Collect Information and Data Needed to Respond to the Prompts of the IVR System;
- Automated System Connects to the IVR System and Provides the Response to Each Prompt Based on Identifying One of the Patterns Determined Previously and the Pattern's Corresponding Action or Response. This may include:
  - speech-to-text transcription of a prompt and analysis of word type (noun or verb, as examples) and entity to generate a pattern;
  - matching the prompt pattern to a previously stored pattern and desired response (which may be represented as a form of rule);
  - based on the match and desired response, the IVR system is navigated to an endpoint or place at which other assistance is needed;
    - this may include speaking with a human customer service representative, leaving a call-back number, providing an account number, or receiving a voice response that provides the caller with the information they need, as examples;
- Automated System Records Result of Responding to Prompts and/or Notifies User to Participate in a Call.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 422 of FIG. 4) may include each application module. Alternatively, different application servers may include different sets of application modules. Such sets may be disjoint or overlapping.

The data storage layer 520 may include one or more data objects 522 each having one or more data object components 521, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 3-5 are not intended to be limiting examples. Further environments in which an embodiment of the invention may be implemented in whole or in part include devices (including mobile devices), software applications, systems, apparatuses, networks, SaaS platforms, laaS (infrastructure-as-a-service) platforms, or other configurable components that may be used by multiple users for data entry, data processing, application execution, or data review.

The disclosure includes the following clauses and embodiments:

1. A method of enabling automated navigation through an interactive voice response system, comprising:
   - accessing an interactive voice response system;
   - determining a set of speech prompts used to traverse the interactive voice response system's menus and sub-menus;
   - for each speech prompt in the set of speech prompts
     - converting the speech prompt to text;
     - determining a part of speech for each word in the text of the speech prompt, and a confidence level in that determination;
     - determining each entity in the text of the speech prompt;
     - representing the speech prompt as a corresponding pattern of an entity or entities and parts of speech;
     - associating an action or response for an automated navigation system to provide to the interactive voice response system in response to identification of the pattern corresponding to the speech prompt; and
     - storing information regarding the corresponding pattern and the associated action or response for the speech prompt in an electronic data storage element.

2. The method of clause 1, further comprising:
   - operating the automated navigation system to collect information and data needed to respond to speech prompts of the interactive voice response system;
   - connecting the automated navigation system to the interactive voice response system;
   - operating the automated navigation system to provide an action or response to each prompt of the interactive voice response system based on identifying one of the patterns determined previously and the pattern's associated action or response; and
   - operating the automated navigation system to record a result of the action or response to each speech prompt of the interactive voice response system.

3. The method of clause 2, further comprising notifying a user to participate in a call.

4. The method of clause 2, wherein the information and data needed to respond to prompts of the interactive voice response system comprises one or more of a name, an account number, a location, or an identification number of a person or product.

5. The method of clause 1, wherein the associated action or response for the automated navigation system to provide to the interactive voice response system is one or more of a spoken word or phrase, silence, hanging up, or generating one or more tones corresponding to a key press on a keypad.

6. The method of clause 1, wherein the stored information regarding the corresponding pattern and the associated action or response for the automated navigation system to provide to the interactive voice response system in response to identification of the pattern corresponding to the speech prompt includes a matching rule used at least in part to determine which of a set of patterns corresponds to a prompt received from the interactive voice response system.

7. A system for enabling automated navigation through an interactive voice response system, comprising:
   - one or more non-transitory computer-readable media including a set of computer-executable instructions;
   - one or more electronic processors configured to execute the set of computer-executable instructions, wherein when executed, the instructions cause the system to access an interactive voice response system;
     - determine a set of speech prompts used to traverse the interactive voice response system's menus and sub-menus;
     - for each speech prompt in the set of speech prompts
       - convert the speech prompt to text;
       - determine a part of speech for each word in the text of the speech prompt, and a confidence level in that determination;
       - determine each entity in the text of the speech prompt;
       - represent the speech prompt as a corresponding pattern of an entity or entities and parts of speech;
       - associate an action or response for an automated navigation system to provide to the interactive voice response system in response to identification of the pattern corresponding to the speech prompt; and
       - store information regarding the corresponding pattern and the associated action or response for the speech prompt in an electronic data storage element.

8. The system of clause 7, wherein the instructions further cause the system to:
   - operate the automated navigation system to collect information and data needed to respond to speech prompts of the interactive voice response system;
   - connect the automated navigation system to the interactive voice response system;
   - operate the automated navigation system to provide an action or response to each prompt of the interactive voice response system based on identifying one of the patterns determined previously and the pattern's associated action or response; and
   - operate the automated navigation system to record a result of the action or response to each speech prompt of the interactive voice response system.

9. The system of clause 7, wherein the instructions further cause the system to notify a user to participate in a call.

10 The system of clause 8, wherein the information and data needed to respond to prompts of the interactive voice response system comprises one or more of a name, an account number, a location, or an identification number of a person or product.

11. The system of clause 7, wherein the associated action or response for the automated navigation system to provide to the interactive voice response system is one or more of a spoken word or phrase, silence, hanging up, or generating one or more tones corresponding to a key press on a keypad.

12. The system of clause 7, wherein the stored information regarding the corresponding pattern and the associated action or response for the automated navigation system to provide to the interactive voice response system in response to identification of the pattern corresponding to the speech prompt includes a matching rule used at least in part to determine which of a set of patterns corresponds to a prompt received from the interactive voice response system.

13. One or more non-transitory computer-readable media including a set of computer-executable instructions that when executed by one or more programmed electronic processors, cause the processors to:

access an interactive voice response system;

determine a set of speech prompts used to traverse the interactive voice response system's menus and sub-menus;

for each speech prompt in the set of speech prompts convert the speech prompt to text;

determine a part of speech for each word in the text of the speech prompt, and a confidence level in that determination;

determine each entity in the text of the speech prompt;

represent the speech prompt as a corresponding pattern of an entity or entities and parts of speech;

associate an action or response for an automated navigation system to provide to the interactive voice response system in response to identification of the pattern corresponding to the speech prompt; and store information regarding the corresponding pattern and the associated action or response for the speech prompt in an electronic data storage element, 14. The one or more non-transitory computer-readable media of clause 13, wherein the instructions further cause the processors to:

operate the automated navigation system to collect information and data needed to respond to speech prompts of the interactive voice response system;

connect the automated navigation system to the interactive voice response system;

operate the automated navigation system to provide an action or response to each prompt of the interactive voice response system based on identifying one of the patterns determined previously and the pattern's associated action or response; and operate the automated navigation system to record a result of the action or response to each speech prompt of the interactive voice response system.

15. The one or more non-transitory computer-readable media of clause 13, wherein the instructions further cause the processors to generate a notification to a user to participate in a call.

16. The one or more non-transitory computer-readable media of clause 14, wherein the information and data needed to respond to prompts of the interactive voice response system comprises one or more of a name, an account number, a location, or an identification number of a person or product.

17 The one or more non-transitory computer-readable media of clause 13, wherein the associated action or response for the automated navigation system to provide to the interactive voice response system is one or more of a spoken word or phrase, silence, hanging up, or generating one or more tones corresponding to a key press on a keypad.

18. The one or more non-transitory computer-readable media of clause 13, wherein the stored information regarding the corresponding pattern and the associated action or response for the automated navigation system to provide to the interactive voice response system in response to identification of the pattern corresponding to the speech prompt includes a matching rule used at least in part to determine which of a set of patterns corresponds to a prompt received from the interactive voice response system.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Machine learning (ML) is being used more and more to enable the analysis of data and assist in making decisions in multiple industries. To benefit from using machine learning, a machine learning algorithm is applied to a set of training data and labels to generate a "model" which represents what the application of the algorithm has "learned" from the training data. Each element (or instances or example, in the form of one or more parameters, variables, characteristics or "features") of the set of training data is associated with a label or annotation that defines how the element should be classified by the trained model. A machine learning model in the form of a neural network is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. A trained neural network, trained machine learning model, or any other form of decision or classification process may be used to implement one or more of the methods, functions, processes, or operations described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" (nodes) that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as Python, Java, JavaScript, C, C++, or Perl using procedural, functional, object-oriented, or other techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of all examples, or exemplary language (e.g., "such as") provided herein, is intended merely to better illuminate embodiments of the disclosure and does not pose a limitation to the scope of the invention unless otherwise claimed. No language in the specification should be construed as indicating any non-claimed element as essential to each embodiment of the disclosure.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this specification. Accordingly, the disclosed invention is not limited to the embodiments described above or depicted in the drawings, and various embodiments and modifications may be made without departing from the scope of the claims below.

What is claimed is:

1. A method of enabling automated navigation through an interactive voice response system, comprising:

accessing an existing interactive voice response system;

determining a set of speech prompts generated by the existing interactive voice response system and used to traverse the existing interactive voice response system's menus and sub-menus;

for each speech prompt in the set of speech prompts generated by the existing interactive voice response system:

converting the speech prompt to text;

determining a part of speech for each word in the text of the speech prompt;

evaluating a confidence for each word in the speech prompt to text conversion and in the determination of the part of speech for each word in the text;

determining each entity in the text of the converted speech prompt;

representing the speech prompt as a corresponding pattern of an entity or entities and parts of speech;

evaluating the corresponding pattern to identify whether the prompt represents a command or a question;

associating an action or response for an automated agent to provide to the existing interactive voice response system in response to identification of the pattern corresponding to the speech prompt; and storing information regarding the corresponding pattern and the associated action or response for the speech prompt in an electronic data storage element.

2. The method of claim 1, further comprising:

operating the automated agent to collect information and data needed to respond to speech prompts of the existing interactive voice response system;

connecting the automated agent to the existing interactive voice response system, the automated agent generating an incoming call to the existing interactive voice response system;

operating the automated agent to provide an action or response to each prompt of the existing interactive voice response system based on identifying one of the previously determined patterns and the pattern's associated action or response, wherein the previously determined pattern corresponds to a command or a question; and operating the automated agent to record a result of the action or response to each speech prompt of the existing interactive voice response system.

3. The method of claim 2, wherein the information and data needed to respond to prompts of the existing interactive voice response system comprises one or more of a name, an account number, a location, or an identification number of a person or product.

4. The method of claim 1, wherein the associated action or response for the automated agent to provide to the existing interactive voice response system is one or more of a spoken word or phrase, silence, hanging up, or generating one or more tones corresponding to a key press on a keypad.

5. The method of claim 1, wherein the stored information regarding the corresponding pattern and the associated action or response for the automated agent to provide to the existing interactive voice response system in response to identification of the pattern corresponding to the speech prompt includes an indication of the intent of the speech prompt.

6. A system for enabling automated navigation through an interactive voice response system, comprising:

one or more non-transitory computer-readable media including a set of computer-executable instructions;

one or more electronic processors configured to execute the set of computer-executable instructions, wherein when executed, the instructions cause the system to access an existing interactive voice response system;

determine a set of speech prompts generated by the existing interactive voice response system and used to traverse the existing interactive voice response system's menus and sub-menus;

for each speech prompt in the set of speech prompts generated by the existing interactive voice response system:

convert the speech prompt to text;

determine a part of speech for each word in the text of the speech prompt;

evaluating a confidence for each word in the speech prompt to text conversion and in the determination of the part of speech for each word in the text;

determine each entity in the text of the converted speech prompt;

represent the speech prompt as a corresponding pattern of an entity or entities and parts of speech;

evaluate the corresponding pattern to identify whether the prompt represents a command or a question;

associate an action or response for an automated agent to provide to the existing interactive voice response system in response to identification of the pattern corresponding to the speech prompt; and store information regarding the corresponding pattern and the associated action or response for the speech prompt in an electronic data storage element.

7. The system of claim 6, wherein the instructions further cause the system to:

operate the automated agent to collect information and data needed to respond to speech prompts of the existing interactive voice response system;

connect the automated agent to the existing interactive voice response system, the automated agent generating an incoming call to the existing interactive voice response system;

operate the automated agent to provide an action or response to each prompt of the existing interactive voice response system based on identifying one of the previously determined patterns and the pattern's associated action or response, wherein the previously determined pattern corresponds to a command or a question; and operate the automated agent to record a result of the action or response to each speech prompt of the existing interactive voice response system.

8. The system of claim 7, wherein the information and data needed to respond to prompts of the existing interactive voice response system comprises one or more of a name, an account number, a location, or an identification number of a person or product.

9. The system of claim 6, wherein the associated action or response for the automated agent to provide to the existing interactive voice response system is one or more of a spoken word or phrase, silence, hanging up, or generating one or more tones corresponding to a key press on a keypad.

10. The system of claim 6, wherein the stored information regarding the corresponding pattern and the associated action or response for the automated agent to provide to the existing interactive voice response system in response to identification of the pattern corresponding to the speech prompt includes an indication of the intent of the speech prompt.

11. One or more non-transitory computer-readable media including a set of computer-executable instructions that when executed by one or more programmed electronic processors, cause the processors to:

access an existing interactive voice response system;

determine a set of speech prompts generated by the existing interactive voice response system and used to traverse the existing interactive voice response system's menus and sub-menus;

for each speech prompt in the set of speech prompts generated by the existing interactive voice response system:

convert the speech prompt to text;

determine a part of speech for each word in the text of the speech prompt;

evaluating a confidence for each word in the speech prompt to text conversion and in the determination of the part of speech for each word in the text;

determine each entity in the text of the converted speech prompt;

represent the speech prompt as a corresponding pattern of an entity or entities and parts of speech;

evaluate the corresponding pattern to identify whether the prompt represents a command or a question;

associate an action or response for an automated agent to provide to the existing interactive voice response system in response to identification of the pattern corresponding to the speech prompt; and store information regarding the corresponding pattern and the associated action or response for the speech prompt in an electronic data storage element.

12. The one or more non-transitory computer-readable media of claim 11, wherein the instructions further cause the processors to:

operate the automated agent to collect information and data needed to respond to speech prompts of the existing interactive voice response system;

connect the automated agent to the existing interactive voice response system, the automated agent generating an incoming call to the existing interactive voice response system;

operate the automated agent to provide an action or response to each prompt of the existing interactive voice response system based on identifying one of the previously determined patterns and the pattern's associated action or response, wherein the previously determined pattern corresponds to a command or a question; and operate the automated agent to record a result of the action or response to each speech prompt of the existing interactive voice response system.

13. The one or more non-transitory computer-readable media of claim 12, wherein the information and data needed to respond to prompts of the existing interactive voice response system comprises one or more of a name, an account number, a location, or an identification number of a person or product.

14. The one or more non-transitory computer-readable media of claim 11, wherein the associated action or response for the automated agent to provide to the existing interactive voice response system is one or more of a spoken word or phrase, silence, hanging up, or generating one or more tones corresponding to a key press on a keypad.

15. The one or more non-transitory computer-readable media of claim 11, wherein the stored information regarding the corresponding pattern and the associated action or response for the automated agent to provide to the existing interactive voice response system in response to identification of the pattern corresponding to the speech prompt includes an indication of the intent of the speech prompt.

* * * * *